(12) United States Patent
Morgan

(10) Patent No.: US 7,784,805 B2
(45) Date of Patent: Aug. 31, 2010

(54) PROGRESSIVE COMPRESSION SUSPENSION

(76) Inventor: Dan Morgan, 1110 Harding Ave., National City, CA (US) 91950

( * ) Notice: Subject to any disclaimer, the term of this patent is extended or adjusted under 35 U.S.C. 154(b) by 847 days.

(21) Appl. No.: 11/283,420

(22) Filed: Nov. 21, 2005

(65) Prior Publication Data
US 2007/0114747 A1 May 24, 2007

(51) Int. Cl.
*B60G 7/00* (2006.01)
*B60G 3/18* (2006.01)
*B60G 3/20* (2006.01)
*B60G 3/12* (2006.01)
*B60G 3/00* (2006.01)

(52) U.S. Cl. .................. 280/124.134; 280/124.135; 280/124.103; 280/124.128; 280/124.153

(58) Field of Classification Search .......... 280/124.135, 280/124.134, 124.103, 124.128, 124.153
See application file for complete search history.

(56) References Cited

U.S. PATENT DOCUMENTS

| | | | |
|---|---|---|---|
| 4,881,752 A | 11/1989 | Tanaka | 280/690 |
| 6,286,846 B1 | 9/2001 | Aparicio et al. | 280/124.11 |
| 6,793,228 B2 * | 9/2004 | Zadok | 280/124.134 |

* cited by examiner

*Primary Examiner*—Paul N. Dickson
*Assistant Examiner*—Joselynn Y. Sliteris
(74) *Attorney, Agent, or Firm*—Steins & Associates, P.C.

(57) ABSTRACT

A Progressive Compression Suspension is disclosed. The suspension operates to provide floating opposed mounting points for each end of the suspension's shock absorber. The bottom end of the shock absorber pivotally attaches to the lower suspension arm, and the upper end of the shock absorber pivotally attaches to a compression linkage. The compression linkage is pivotally attached to the vehicle frame or chassis, such that it rocks back forth when the suspension engages rough terrain and the top of the shock absorber works in opposition to the bottom of the shock absorber. The rocking of the compression linkage is created by an actuating linkage interconnecting the compression linkage and an eccentric arm extending inwardly towards the frame from the pivot point of the lower suspension arm. As a result of this geometry, if the lower suspension arm is driven upwardly by the terrain, it will (through operation of the eccentric arm, actuating linkage and compression linkage) cause the top mounting point of the shock absorber to be driven downwardly. By correctly calculating the dimensional relationships, the resultant effect progressive dampening that is responsive to suspension travel, rather than simple linear dampening.

17 Claims, 8 Drawing Sheets

PROGRESSIVE COMPRESSION SUSPENSION

BACKGROUND OF THE INVENTION

1. Field of the Invention

This invention relates generally to vehicle suspension systems and, more specifically, to a Progressive Compression Suspension.

2. Description of Related Art

The deserts of southwestern United States have become an adult playground for many people. In these regions, many people spend a great deal of their recreational time and money engaging driving a variety of different types of vehicles around the desert sand dunes. The most widely prevalent vehicle type is the dune or sand buggy. Sand buggies come in a variety of sizes and shapes depending upon their intended use pattern and purpose. There are sand buggies that are essentially cars or trucks with increased suspension travel, large sand-compatible tires, and engines modified to be durable in the hot sandy desert environment.

Other sand buggies go far beyond the basic version described above. These high-end sand buggies have specialized frames, seats, engines, tires and suspension systems so that they can not only be used to drive around the sand dunes, but can actually be raced at high speed in these environments. The suspensions in these high-end sand buggies tend to be an area of particular operational (and therefore design) concern. In sand buggies, having a powerful engine will be worthless if it is being supported by a weak suspension. Particularly because the more powerful the engine, the faster the buggy will go, and therefore the more punishment that the buggy's suspension will sustain. Sand buggy manufacturers and aficionados are constantly in search of new improvements in sand buggy suspensions.

FIG. 1 is a partial cutaway rear view of a conventional sand buggy front suspension 10. As discussed above, there are many shapes and sizes for buggy suspensions, with this version being provided only to give the reader an introduction to the prior art approaches and general layout of buggy suspensions.

The front suspension 10 of a prior sand buggy (half of which is shown here) has a large, ballooning tire 16 attached to a oversized wheel 12. The wheel 12 spins on a short axle 14. A front brake rotor 20 is usually associated with the wheel 12 to provide additional stopping power to the vehicle.

The wheel 12 extends from a spindle 18. The spindle 18 provides the support for the wheel 12 and allows it to be operatively turned by the steering linkage 28 (which is driven by the non-depicted steering system). In its classic form, an off-road front suspension has an upper A arm 22 pivotally connected to the buggy frame 26 and terminating in a swiveling "knuckle" joint at the spindle 18.

Similarly, a lower A arm 24 is also pivotally attached to the frame 26 and also terminates in a knuckle joint at the spindle 18. As should be casually obvious, the pivotal connections at the ends of the upper and lower A arms 22 and 24 will permit the wheel 12 to travel up and down while keeping the tire tread substantially parallel to the ground.

The off road shock assembly 30 is the device that creates the horizontal support necessary to allow the suspension 10 to bear the load of the buggy, as well as permitting the large suspension travel needed for sand activities. The shock assembly 30 of course also provides shock absorption to stabilize the buggy's ride. The shock assembly 30 attaches to the frame 26 at its upper end, and to a midpoint of the lower A arm 24 at its lower end. In this position, the shock assembly 30 will work on the relative motion between the top of the frame 26 and the pivot point where it attaches to the lower A arm 24. The upper A arm 22 simply keeps the spindle 18 upright as the shock assembly 30 permits the lower A arm 22 to travel up and down due to external force from bumps and the like.

The shock assembly 30 used with the prior art off road suspension systems is the focal point of these systems. Most owners of vehicles employing the depicted design will spend substantial time and money improving the performance of the shock assembly 30 in order to improve the overall performance of the suspension 10. The assembly 30 typically has a spring-assisted shock absorber 32, which is a heavy duty shock absorber that has a spring mechanism to provide the suspension with support as well as dampening. Many times, there is also an oil reservoir 34 attached to the assembly 30 to allow for the expanded travel of the shock without enlarging the shock cylinder.

Another approach to improving the shock assembly 30 for off road use is to use a 2-stage spring assembly 36 (versus a single stage). The 2-stages of such a spring assembly provide a spring assisted shock that has different spring tensions for different compression conditions (i.e. lower spring tension when the shock is under low compression, but high spring tension once the low spring tension spring is fully compressed by excessive shock travel). Adding the second spring stage adds cost, of course, and really doesn't improve the mechanics of the suspension 10.

Still another approach for improving performance of the suspension is to add an additional shock absorber that works somewhat in tandem with the two-stage spring shock 30. These "override" shock assemblies are designed to improve suspension dampening when the suspension is at the end of what would be a standard suspension's compressed travel. Adding an override shock also adds substantial cost to the suspension 10, as well as another item that will require periodic replacement.

What is really needed is a new suspension geometry that allows the suspension to use a fairly low-cost single-stage spring-assisted shock absorber, while providing the necessary suspension travel and vibration dampening for high-speed sand travel.

SUMMARY OF THE INVENTION

In light of the aforementioned problems associated with the prior devices and systems, it is an object of the present invention to provide a Progressive Compression Suspension. The suspension should operate to provide floating opposed mounting points for each end of the suspension's shock absorber. The bottom end of the shock absorber should pivotally attach to the lower suspension arm, and the upper end of the shock absorber should pivotally attach to a compression linkage. The compression linkage should be pivotally attached to the vehicle frame or chassis, and should rock back forth when the suspension engages rough terrain so that the top of the shock absorber works in opposition to the bottom of the shock absorber. The rocking of the compression linkage should be created by an actuating linkage interconnecting the compression linkage and an eccentric arm extending inwardly towards the frame from the pivot point of the lower suspension arm. As a result of this geometry, if the lower suspension arm is driven upwardly by the terrain, it should (through operation of the eccentric arm, actuating linkage and compression linkage) cause the top mounting point of the shock absorber to be driven downwardly. If the dimensional relationships are calculated correctly, the resultant effect should be to obtain progressive dampening that is responsive to suspension travel, rather than simple linear dampening.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a Progressive Compression Suspension.

Figure 2:
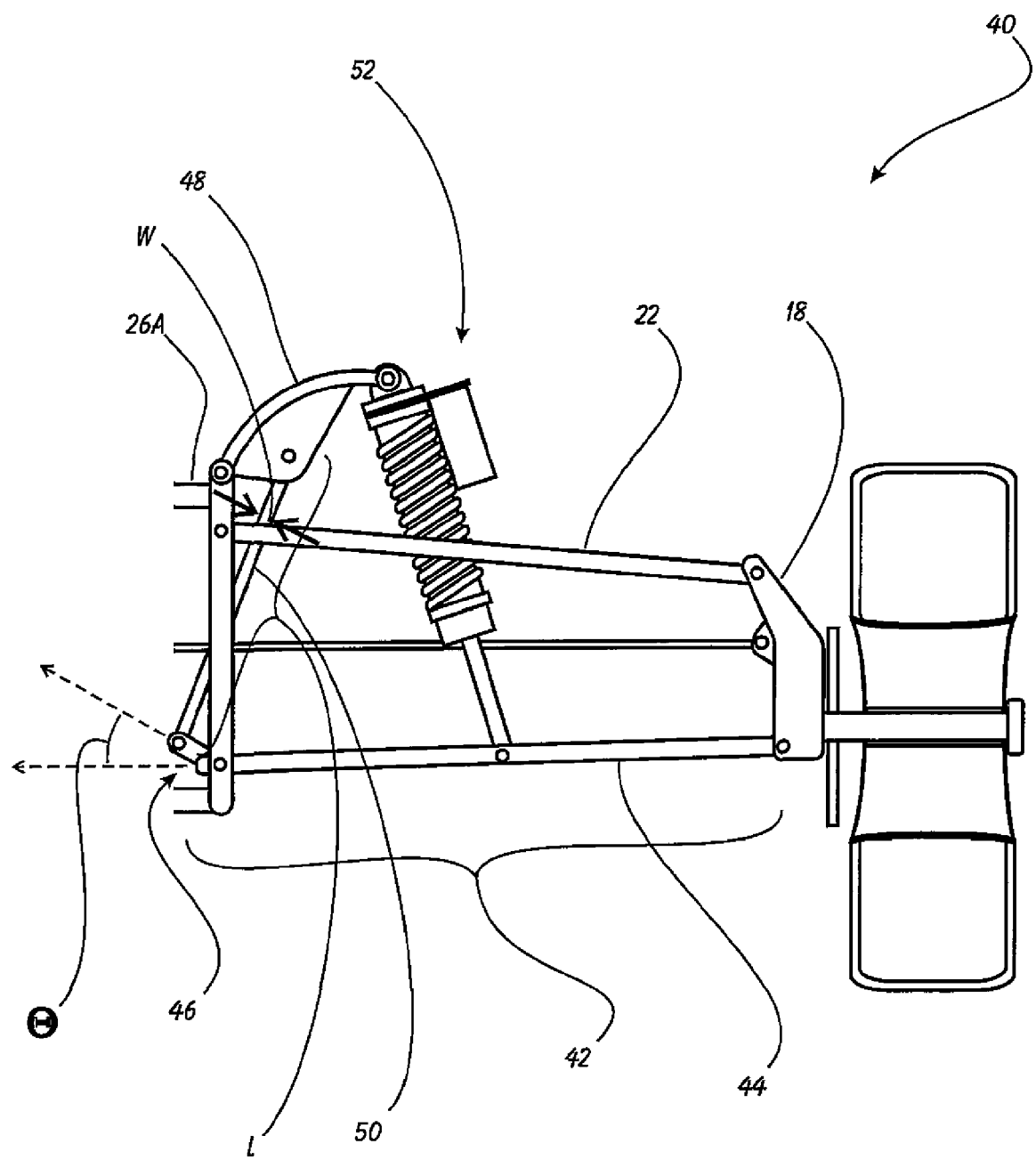
FIG. 2 is a partial cutaway rear view of a sand buggy having a preferred embodiment of the progressive compression front suspension of the present invention.

The present invention can best be understood by initial consideration of FIG. 2. FIG. 2 is a partial cutaway rear view of a sand buggy having a preferred embodiment of the progressive compression front suspension 40 of the present invention. The suspension 40 has a conventional spindle 18, and a generally conventional upper A arm 22 (although it may be modified to allow for the modified geometry of the other components in the suspension). The upper A arm 22 interconnects the spindle 18 with the upper portion of the frame 26A, and as with the prior suspension, causes the spindle 18 to remain upright while the lower A arm having eccentric actuator 42 travels up and down.

It is the lower A arm having eccentric actuator 42, as well as other new elements that cause the unique performance attributes of this suspension 40. The lower A arm having eccentric actuator 42 has an A arm portion 44 (much like a conventional lower A arm), but also has an eccentric arm portion 46 extending from the frame-side end of the A arm portion 44.

The simplified off road shock assembly 52 has a (typically single-stage) spring-assisted shock assembly that attaches to the A arm portion 44 of the lower A arm having eccentric actuator 42 (similar to the prior art lower A arm). At its top end, however, the shock assembly 52 attaches to a new suspension element—the compression linkage 48. The compression linkage 48 is pivotally attached to the frame 26A such that it can exercise a rocking motion. This rocking motion will allow the top end of the shock assembly 52 to travel up and down, rather than being fixed in a single position as with the prior art suspension design.

The compression linkage 48 is driven through this rocking motion by an actuating linkage 50. The actuating linkage 50 is pivotally attached at one end to the end of the eccentric arm portion 46, and at its other end to the compression linkage 48. As shown, there is an angle (the eccentric arm angle $\Theta$) between the longitudinal axis of the A arm portion 44 and the eccentric arm portion 46 (i.e. the eccentric arm portion angles upwardly from a longitudinal axis defined by the A arm portion) at an angle between zero and ninety degrees. The preferred eccentric arm angle $\Theta$ is less than 30 degrees.

As depicted here, in its preferred form the actuating linkage 50 defines a length "L" that is greater than ten times its width "W."

Figure 3:
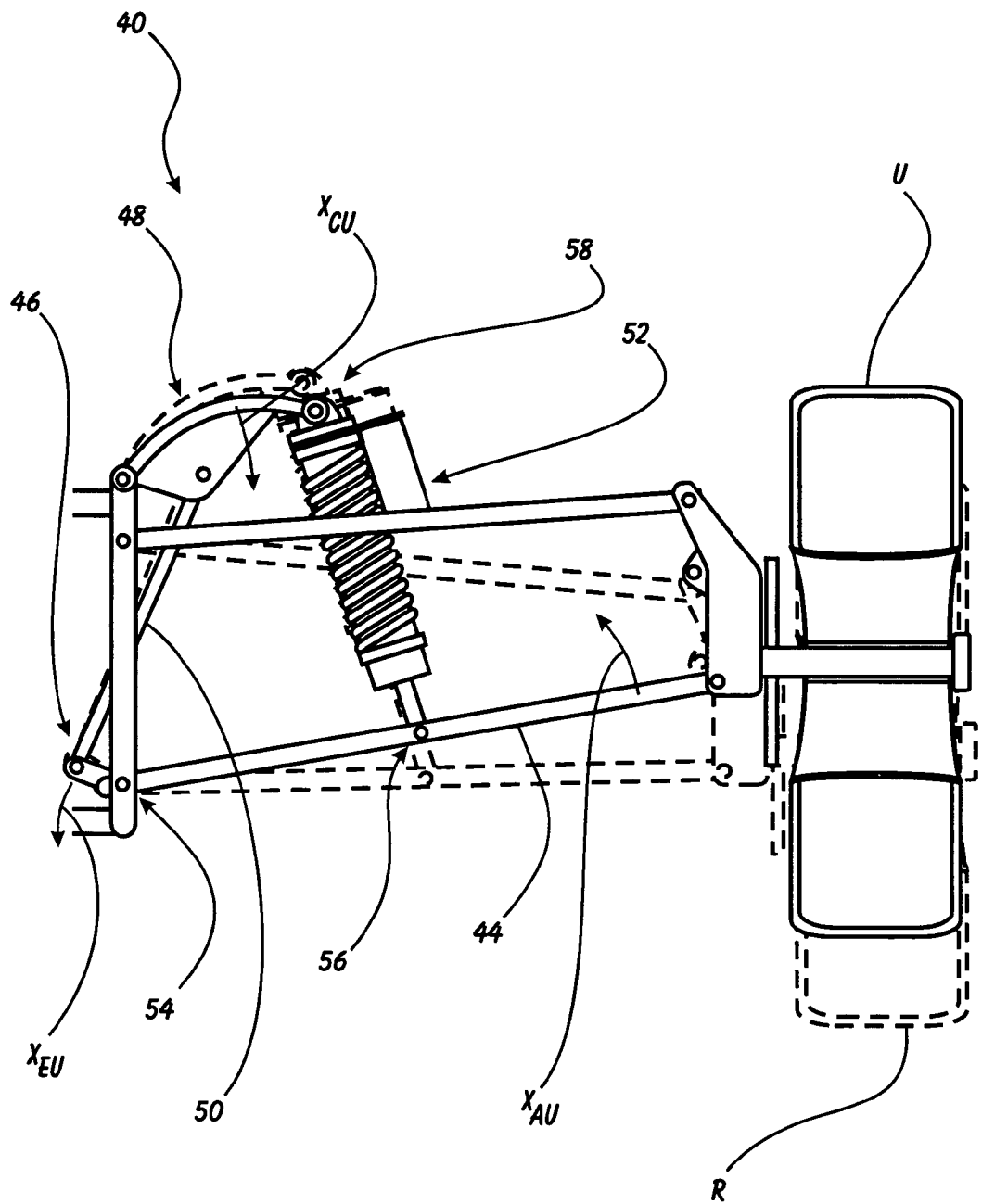
FIG. 3 is a partial cutaway rear view of the suspension of FIG. 2 when the wheel has traveled upwardly.

As should be apparent, movement of the eccentric arm portion 46 will cause the actuating linkage 50 to also move, which in turn will cause the compression linkage 48 to rock either upwardly or downwardly. Rocking of the compression linkage 48 will either increase or decrease the compression or extension of the shock assembly 52. FIG. 3 is provided to assist in the understanding of the effect created by this novel design.

FIG. 3 is a partial cutaway rear view of the suspension 40 of FIG. 2 when the wheel has traveled upward. Here, the dashed lines are provided to show the suspension 40 when it is in its rest position "R" (which was shown in FIG. 2). The solid lines depict the suspension 40 when the external forces on the suspension 40 have driven it into an upwardly-deflected condition "U."

Figure 1:
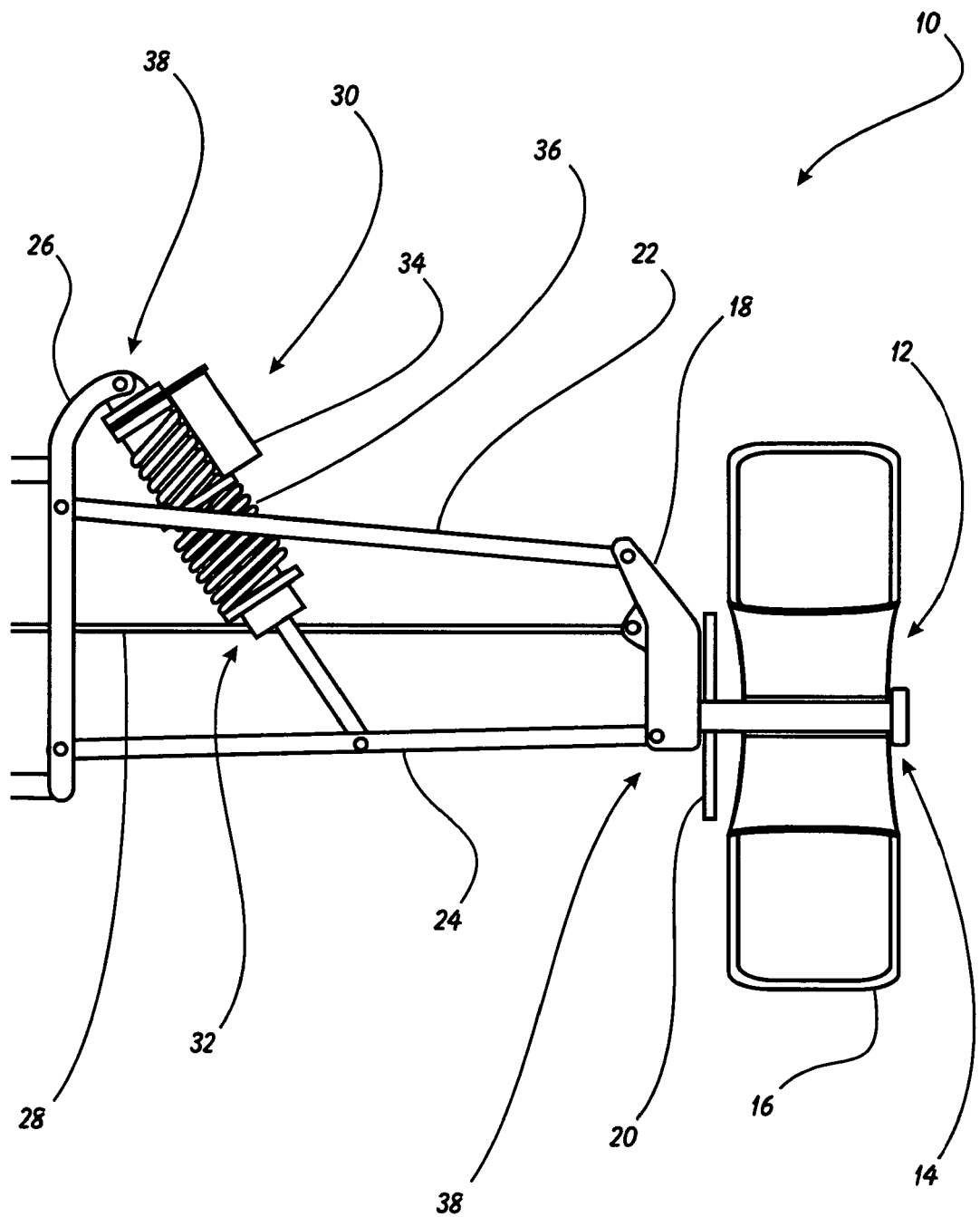
FIG. 1 is a partial cutaway rear view of a conventional sand buggy front suspension.

As the wheel travels upwardly, the spindle 18 forces the A arm portion 44 to pivot around the lower A arm pivot axis 54 (where the lower A arm pivotally attaches to the frame 26A). The A arm portion will move in direction $X_{AU}$ ("AU" denotes A-arm Up), which will cause the shock lower mount 56 to travel upwardly (similar to the conventional suspension of FIG. 1).

Figure 4:
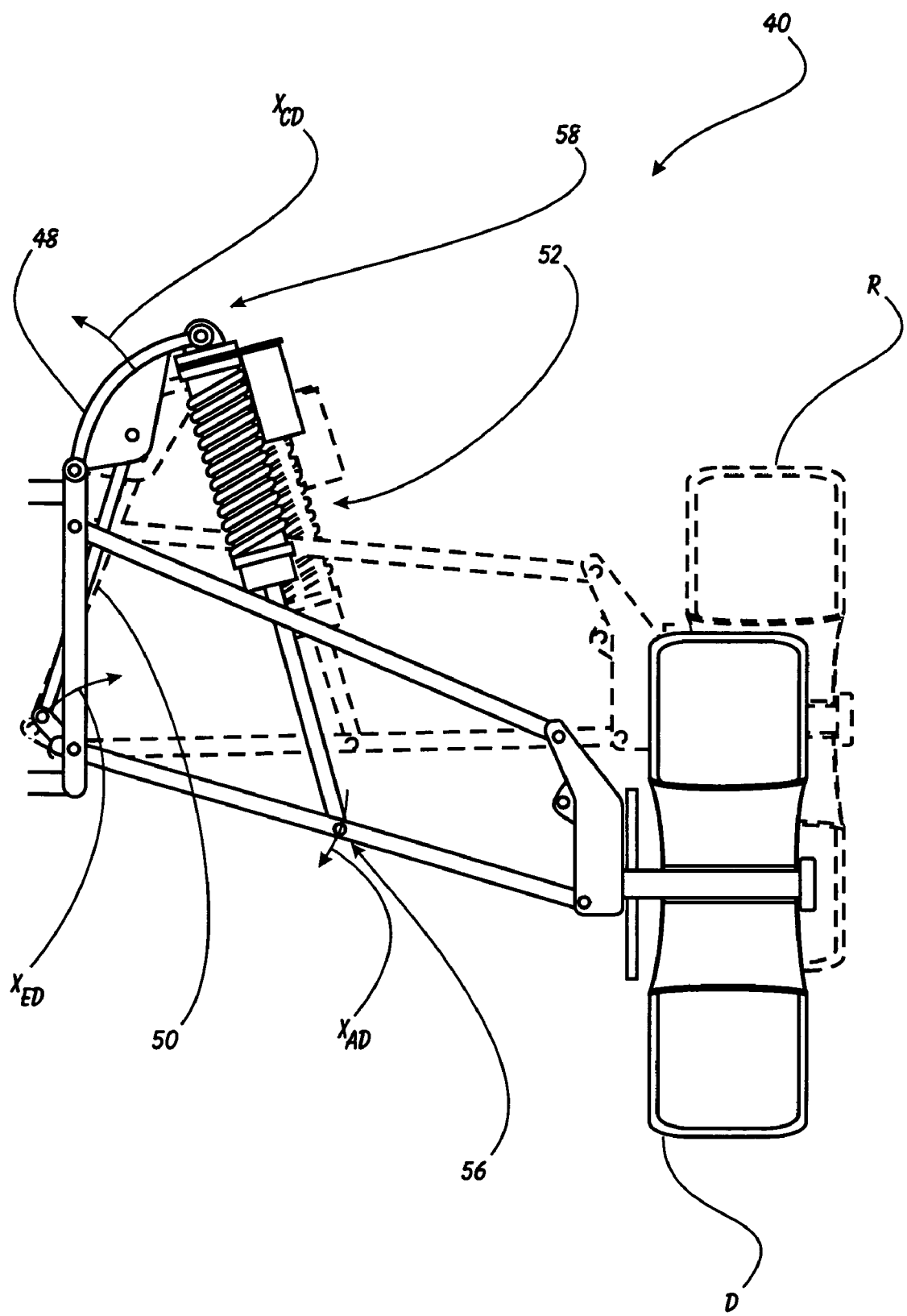
FIG. 4 is a partial cutaway rear view of the suspension of FIGS. 2 and 3 when the wheel has traveled downwardly.

The eccentric arm portion 46, however, will be caused to rotate in the opposite direction relative to the A arm portion 44, since it is on the opposite side of the pivot axis 54. The eccentric arm portion 46 will therefore move in direction $X_{EU}$. By moving in direction $X_{EU}$, the eccentric arm portion 46 pulls the actuating linkage 50 downwardly. Moving the actuating linkage 50 down will cause the compression linkage 48 to rock downwardly in direction $X_{CU}$. The downward rocking motion of the compression linkage 48 will cause some additional compressive force on the shock assembly 52 where it attaches at the shock upper mount 58. FIG. 4 provides clarity as to the suspension function when deflected in the opposite direction.

FIG. 4 is a partial cutaway rear view of the suspension 40 of FIGS. 2 and 3 when the wheel has traveled downward. In this figure, the solid lines depict the suspension 40 in a downwardly-deflected condition "D." Here, the A arm portion has moved in direction XAD, causing the eccentric arm portion 46 to move in direction XED. Moving in direction XED pushes the actuating linkage 50 upwardly, which in turn causes the compression linkage 48 to rock in a counter-clockwise direction XCD. As can be seen here, the upper mount 58 has moved upwardly, further adding to the extending velocity and force that the shock assembly 52 experiences (as compared to the prior art suspension having a fixed upper shock mount).

Because of the ratio between the lengths of the eccentric arm portion 46 and the A arm portion 44, the relative rate of motion of the eccentric arm portion 46 and therefore the shock upper mount 58 will vary (relative to the A arm portion and lower mount 56) depending upon where the A arm portion 44 is in its travel. This changing relative compressive (or extending) speed causes the shock assembly 52 to have compound and variable spring and dampening characteristics. When the suspension 40 is near the rest condition R, the suspension 40 tends to react similar to a conventional non-progressively compressive suspension. As the suspension 40 moves away from the rest condition R, the relative motion (either compressing or extending) between the upper and lower shock mounts 58 and 56 will progressively increase. This increase tends to resist bottoming out of the suspension 40 in both the hyper-compressive and hyper-extensive situations. The elegance of this present invention is that it would be counter-intuitive that intentionally over-compressing or hyper-extending the shock absorber by accelerating the shock top mount either up or down would actually create a very controlled and effective dampening force to the vehicle's suspension performance, even in the most aggressive terrain. Now turning to FIGS. 5A and 5B, we can examine the next element of this new suspension.

Figure 5A:
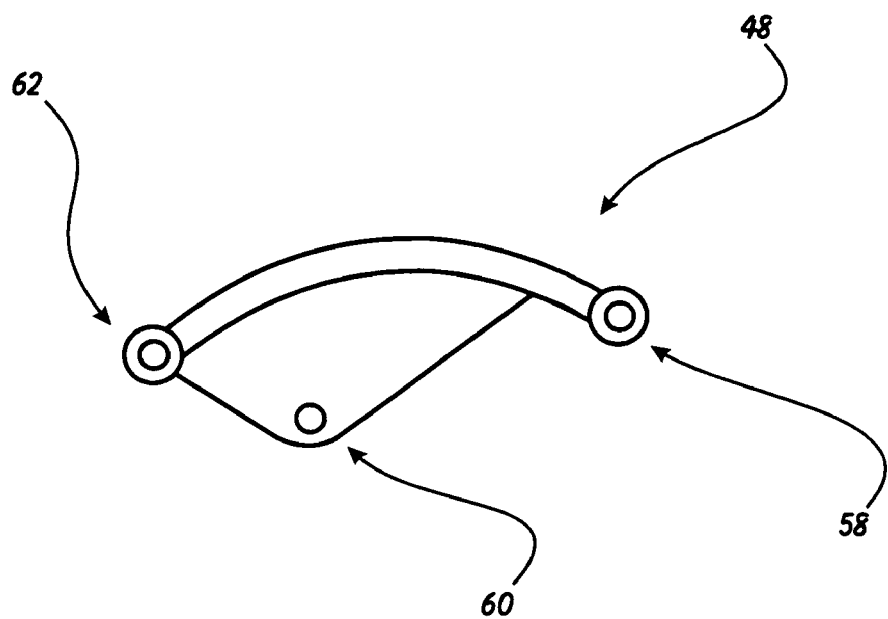
FIGS. 5A and 5B are rear and top views, respectively, of the compression linkage of the suspension of FIGS. 2-4.
Figure 5B:
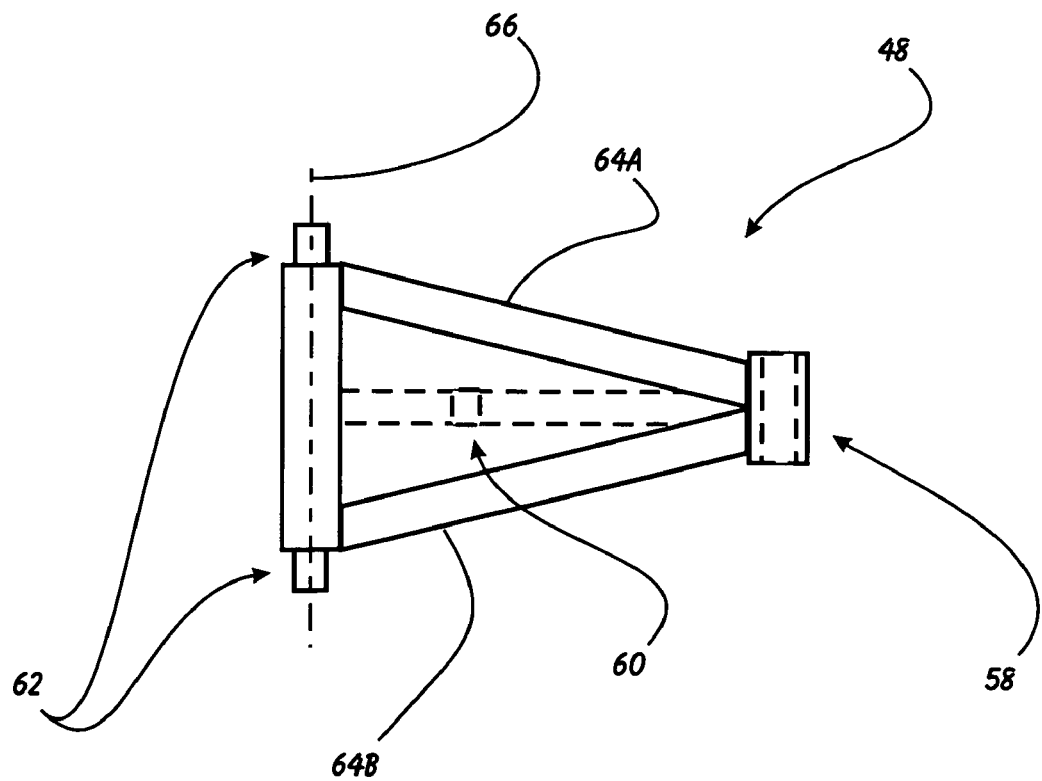

FIGS. 5A and 5B are rear and top views, respectively, of the compression linkage 48 of the suspension of FIGS. 2-4. The linkage 48 has an upper shock mount 58 at one end, and a pair of frame mounting pegs 62 at its opposite end. The actuating linkage pivotally attaches to the compression linkage 48 at the actuating linkage attachment point 60. The frame mounting pegs 62 enable a pivotal connection between the compression linkage 48 and the frame around pivotal axis 66. First and second rails 64A and 64B provide the major structural strength of the linkage 48. The actuating linkage point 60 is preferably an aperture formed in the pair of walls extending downwardly from each rail 64A and 64B. We shall now turn to FIG. 6 to examine the design of the lower A arm used in this suspension.

Figure 6:
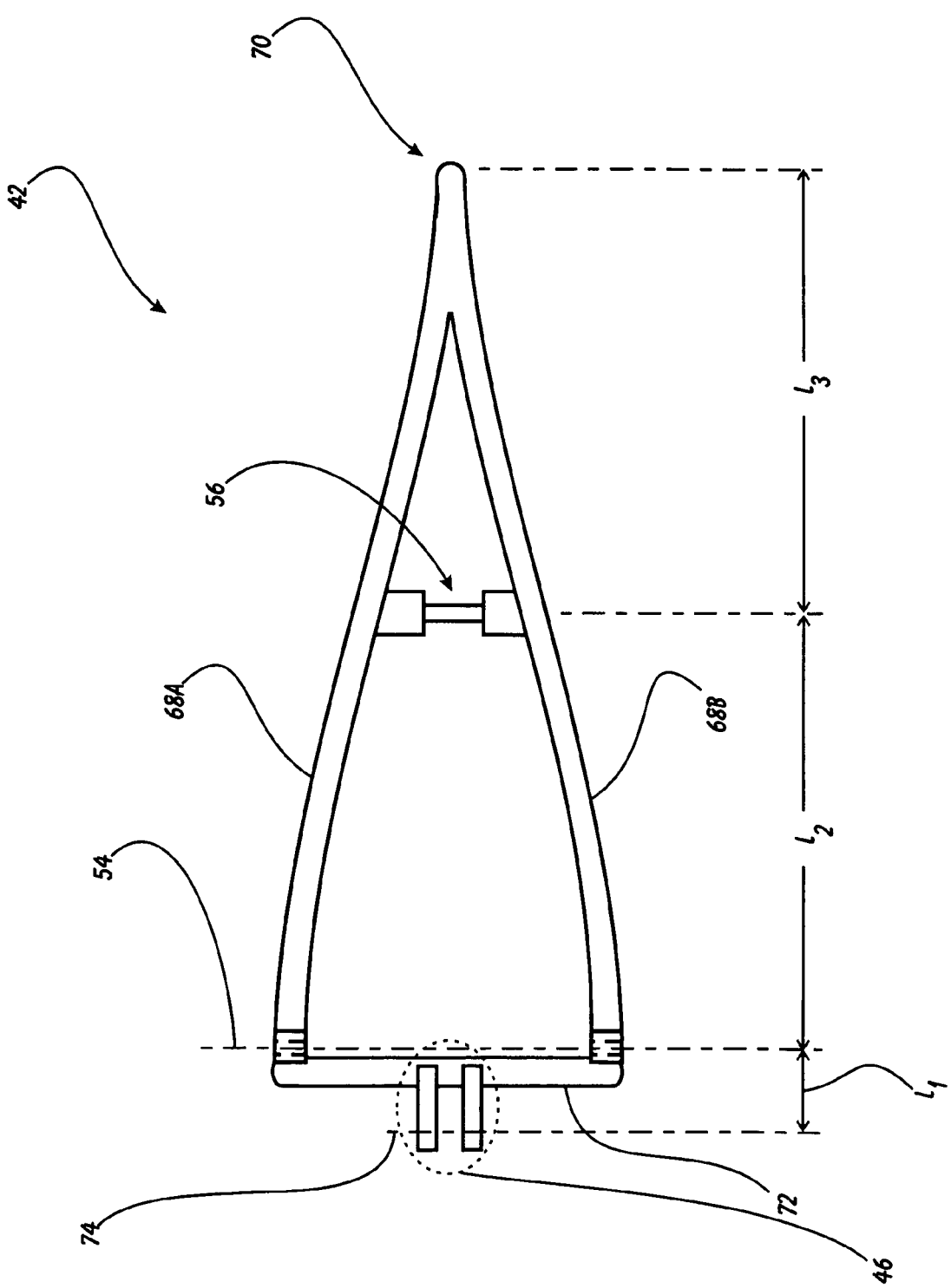
FIG. 6 is a top view of the lower A arm having eccentric actuator of the suspension of FIGS. 2-4.

FIG. 6 is a top view of the lower A arm having eccentric actuator 42 of the suspension of FIGS. 2-4. The A arm 42 has first and second struts 68A and 68B extending between the pivot axis 54 and the spindle knuckle 70. Located in between these two ends is the shock lower mount 56 which serves as the pivot/attachment point of the shock assembly as well as a strengthening brace for the A arm 42. A brace 72 interconnects the distal ends of the struts 68A and 68B. The struts 68A and 68B, spindle knuckle 70, shock lower mount 56 and brace 72 together form the A arm portion of the lower A arm having eccentric actuator 42.

The eccentric arm portion 46 comprises a pair of elongate lobes extending from the opposing side of the brace 72 at a relative angle to the struts 68A and 68B. The eccentric arm portion 46 has defines an actuating linkage lower mount axis 74, which is where the actuating linkage pivots when actuated. As discussed above, the relationships between the various pivot axes located along the lower A arm 42 provide the variable ratio between the movement of the actuating linkage and the shock lower mount 56. Specifically, distance L1, the distance between the actuating linkage lower mount axis 74 and the pivot axis 54 is much smaller than either the distance L2 between the pivot axis 54 and the central axis of the lower shock mount 56, or the distance L3 between the central axis of the lower shock mount 56 and the spindle knuckle 70.

Figure 7:
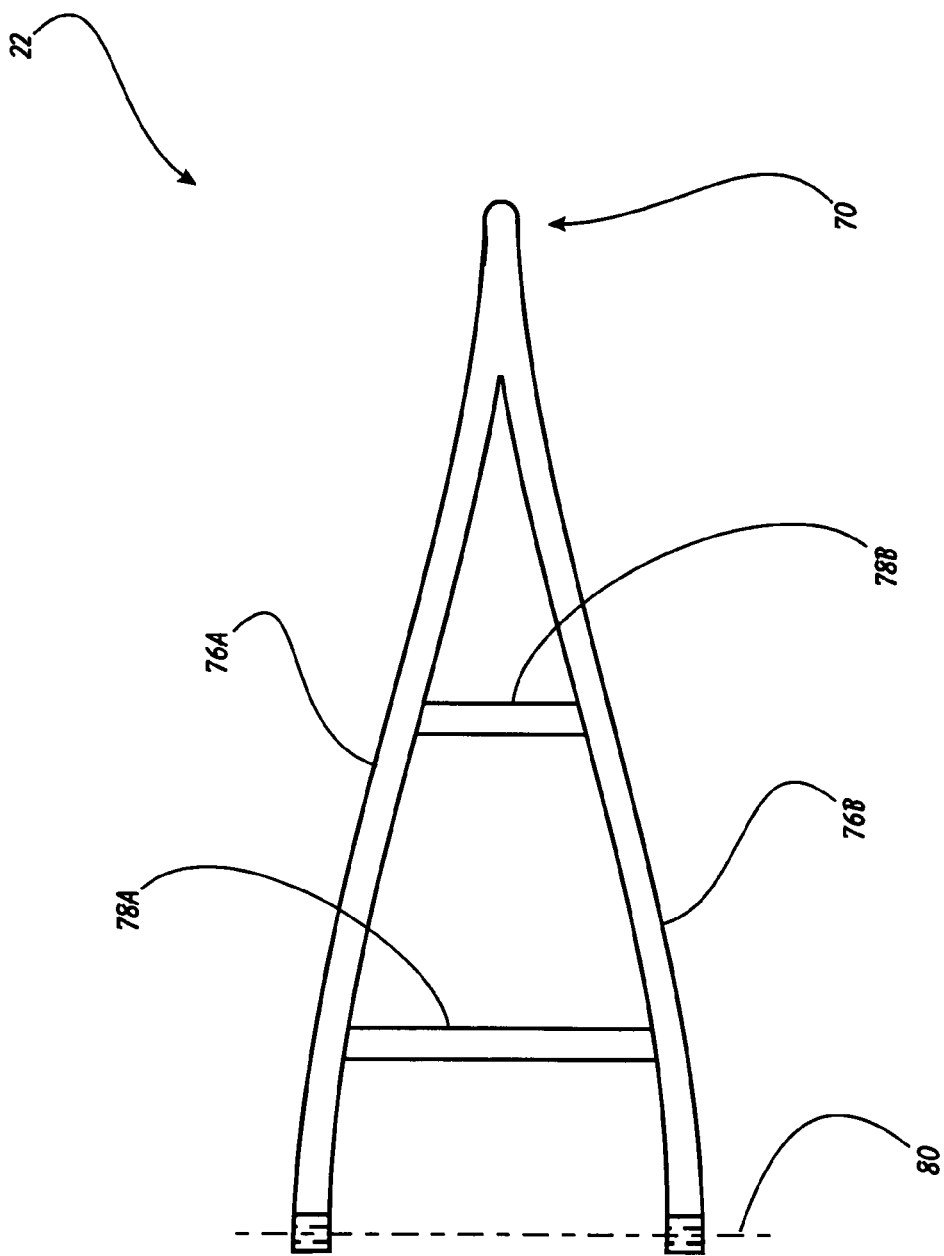
FIG. 7 is a top view of the upper A arm of the suspension of FIGS. 2-4.

FIG. 7 is a top view of the upper A arm 22 of the suspension of FIGS. 2-4. Unless adjusted to account for the addition of the compression linkage and actuating linkage, the upper A arm 22 is essentially unchanged from the prior art. There is a pivot axis 80 opposite from the upper spindle knuckle joint 70. First strut 76A and second strut 76B interconnect the two, with first and second braces 78A and 78B providing structural integrity of the arm 22.

While the application for the suspension of the present invention is depicted here for a front suspension, it is also very suitable for the rear suspension. In fact, the front suspension of a sand buggy tends to suffer more failures than the rear suspension due to the additional punishment being at the leading edge of the vehicle, as well as due to the additional vulnerabilities added by the steering system. Yet another application for this novel suspension arrangement is shown in FIG. 8.

Figure 8:
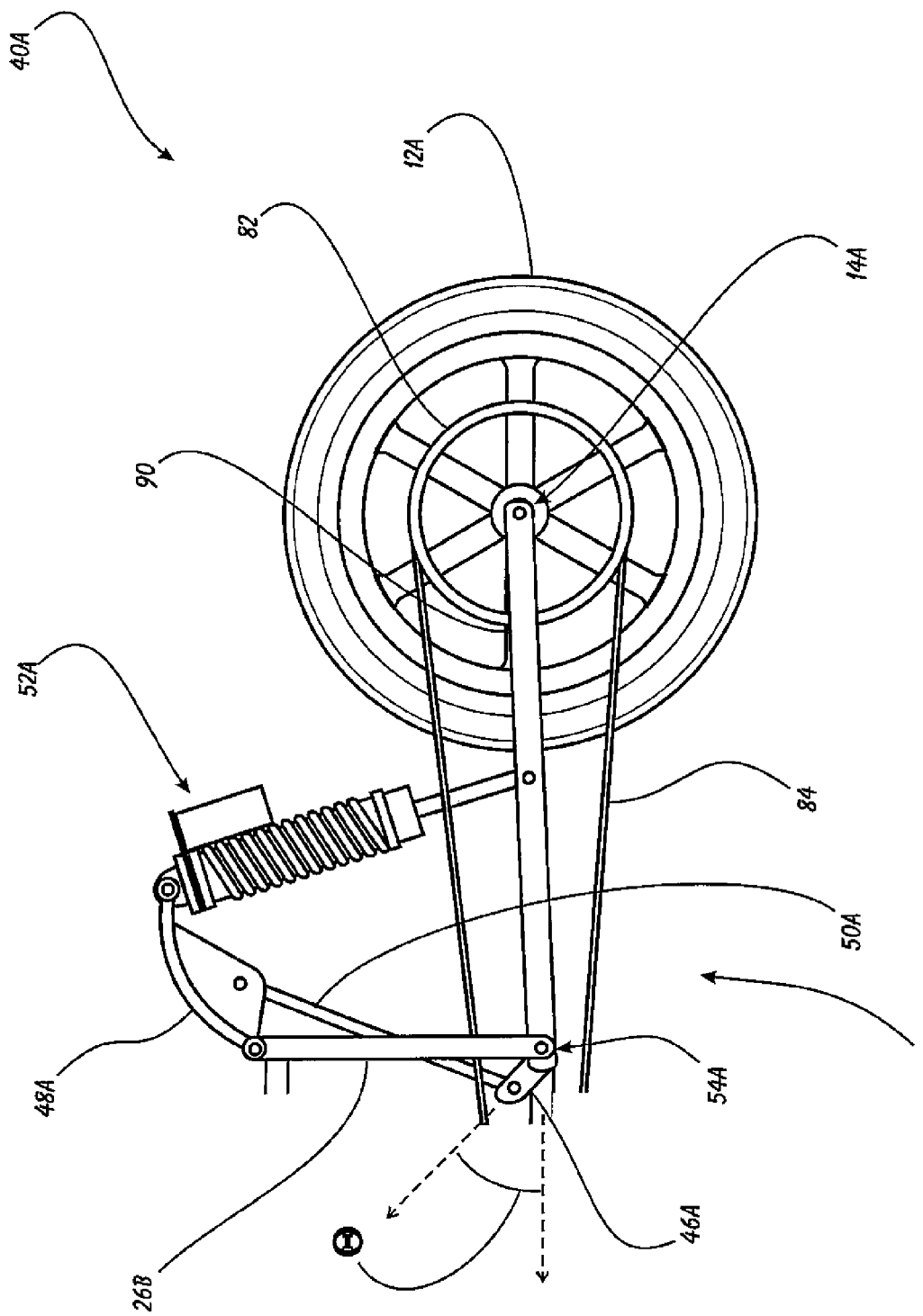
FIG. 8 is a side view of the suspension of the present invention adapted to be a motorcycle rear suspension.

FIG. 8 is a side view of the suspension of the present invention adapted to be a motorcycle rear suspension 40A. Here, the lower A arm of the buggy suspension is converted to a swing arm having eccentric actuator 42A. The swing arm 42A has a swing arm portion 90 extending from the pivot point 54A to the axle 14A. Here, the axle 14A has an axis that is transverse to the swing arm 90. The drive wheel 12A rotates around the axle 14A and is driven by a drive pulley 82 and drive belt 84.

The eccentric arm portion 46A of the swing arm having eccentric actuator 42A extends in an angled upward direction away from the swing arm portion 90. As with the buggy suspension, there is an actuating linkage 50A, a compression linkage 48A and a shock assembly 52A. The progressively compressive action of this novel invention will provide the same substantial benefit to a motorcycle as it does to a sand buggy.

By way of summary, the following is a list of critical benefits resulting from the advancement provided by the present invention:
1. The system does not require the weight of the vehicle to absorb the kinetic energy created by the spring and shock attempting to compress after hitting a bump. The suspension of the present invention is a true rising rate system, and the result imparts less kinetic energy to the frame or body of the vehicle (and its passengers).
2. The system of the present invention substantially reduces the stress on the frame and body components of the vehicle. No compound springs or complex progressive (valved) shock systems are necessary, thereby eliminating a major cost and maintenance component.
3. Vehicle handling is radically improved, in part due to a drastic reduction of body roll. When turning the vehicle's outside wheel suspension action becomes progressively stiffer in relation to its position, while the inside wheel suspension becomes progressively softer, causing less push towards the outside of the turn (i.e. roll).
4. Adjustability and adaptability are provided by this system by virtue of the simplicity of tuning the various linkage lengths and relationships to provide a suspension that can be fine-tuned not only to the vehicle, but also the driver and the terrain being transited.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:
1. A suspension attached to a vehicle frame, comprising:
an upper A arm having a frame end and a distal end, said frame end directly pivotally attached to the frame;
a lower A arm having a first end and a second end, said lower A arm pivotally attached to said frame around a lower pivot axis, and an eccentric arm portion extending from said lower A arm at said first end, said eccentric arm portion terminating in said first end of said lower A arm;

an actuating linkage extending from said lower A arm, said actuating linkage defining a lower end pivotally attached to said lower A arm and an upper end pivotally attached to a compression linkage at an actuating linkage attachment point;

said compression linkage pivotally attached to said frame at an upper pivot axis, said compression linkage further defined by a shock upper mount, with said upper pivot axis, said actuating linkage attachment point and said shock upper mount being in relative spaced relation; and a shock absorber assembly pivotally attached to said upper shock mount at a first end and to a lower shock mount formed on said lower A arm.

2. The suspension of claim 1, wherein said lower A arm is defined by first and second elongate strut members having first ends in spaced relation and second ends attached to one another.

3. The suspension of claim 2, wherein said lower A arm further comprises a brace interconnecting said first ends of said strut members.

4. The suspension of claim 3, wherein said eccentric arm portion extends from said brace, said eccentric arm portion terminating in said first end of said lower A arm, said second ends of said strut members defining said second end of said lower A arm.

5. The suspension of claim 4, wherein said lower pivot axis of said lower A arm is located between said eccentric arm portion and said strut members.

6. The suspension of claim 5, wherein said lower pivot axis is at said first ends of said strut members.

7. A vehicle suspension, the vehicle with which said suspension is associated being defined by a chassis frame, the suspension comprising:

an arm member having a first end and a second end, said arm member directly pivotally attached to said frame around an arm pivot axis, wherein said arm pivot axis is intermediate said first and second end of said arm member;

an actuating linkage extending from said arm member, said actuating linkage defining a lower end pivotally attached to an eccentric arm portion of said arm member and an upper end pivotally attached to a compression linkage at an actuating linkage attachment point, wherein said arm member is defined by an eccentric arm portion commencing at said first end and an arm portion fixedly extending from said eccentric arm portion at said arm pivot axis and terminating in said second end;

said compression linkage pivotally attached to said frame at a linkage pivot axis, said compression linkage further defined by a shock upper mount, with said linkage pivot axis, said actuating linkage attachment point and said shock upper mount being in relative spaced relation; and a shock absorber assembly pivotally attached to said upper shock mount at a first end and to a lower shock mount formed on said arm member.

8. The suspension of claim 7, wherein said eccentric arm portion and said arm portion are non-colinear, whereby said eccentric arm portion defines an eccentric arm angle between a longitudinal axis defined by said arm portion and a longitudinal axis defined by said eccentric arm portion, said eccentric arm angle being between zero and ninety degrees.

9. The suspension of claim 8, wherein said linkage pivot axis lies along said compression linkage, and not between said actuating linkage attachment point and said shock upper mount.

10. The suspension of claim 9, wherein said lower shock mount is located on said arm portion intermediate said arm pivot axis and said second end.

11. The suspension of claim 10, wherein said actuating linkage is an elongate member defining a length that is greater than ten times a width defined by said elongate member.

12. The suspension of claim 11, wherein said eccentric arm angle is less than 30 degrees.

13. A vehicle front suspension attached to a vehicle frame, comprising:

an upper A arm having a frame end and a distal end, said frame end directly pivotally attached to the frame and said distal end pivotally attached to a spindle;

a lower A arm having a first end and a second end, said lower A arm pivotally attached to said frame around a lower A arm pivot axis, said lower A arm pivot axis is intermediate said first and second end of said lower A arm, said second end pivotally attached to said spindle;

an actuating linkage extending from said lower A arm, said actuating linkage defining a lower end pivotally attached to said lower A arm and an upper end pivotally attached to a compression linkage at an actuating linkage attachment point;

said compression linkage pivotally attached to said frame at a linkage pivot axis, said compression linkage further defined by a shock upper mount, with said linkage pivot axis, said actuating linkage attachment point and said shock upper mount each being in relative spaced relation; and a shock absorber assembly pivotally attached to said upper shock mount at a first end and to a lower shock mount formed on said lower A arm.

14. The suspension of claim 13, wherein said linkage pivot axis lies outside said actuating linkage attachment point and said shock upper mount.

15. The suspension of claim 14, wherein said lower A arm is defined by an eccentric arm portion and an a-arm portion, said lower shock mount is located on said a-arm portion intermediate said lower A arm pivot axis and said second end.

16. The suspension of claim 15, wherein said eccentric arm portion and said a-arm portion are non-colinear, whereby said eccentric arm portion defines an eccentric arm angle between a longitudinal axis defined by said a-arm portion and a longitudinal axis defined by said eccentric arm portion, said eccentric arm angle being between zero and ninety degrees.

17. The suspension of claim 16, wherein said eccentric arm angle is less than 30 degrees.

* * * * *